United States Patent [19]

Brown

[11] 4,206,660
[45] Jun. 10, 1980

[54] INFINITELY VARIABLE (FROM ZERO UP) TRANSMISSIONS, WITH CONSTANT OR HARMONIC POWER INPUT AND A CHAIN GEAR MULTIACTION CAM

[76] Inventor: Lawrence G. Brown, 3285 Old 395 N., Carson City, Nev. 89701

[21] Appl. No.: 750,125

[22] Filed: Dec. 13, 1976

Related U.S. Application Data

[63] Continuation of Ser. No. 438,728, Feb. 1, 1974, abandoned.

[51] Int. Cl.² .............................................. F16H 35/02
[52] U.S. Cl. .......................................... 74/393; 74/117
[58] Field of Search ................... 74/393, 117, 116, 29, 74/112

[56] References Cited

U.S. PATENT DOCUMENTS

| | | | |
|---|---|---|---|
| 2,502,057 | 3/1950 | Mitchell | 74/29 |
| 2,568,937 | 9/1951 | Stueland | 74/117 |
| 2,834,223 | 5/1958 | Strnad | 74/117 |
| 3,004,440 | 10/1961 | Pernik | 74/117 |
| 3,898,887 | 12/1975 | Grant | 74/29 |
| 3,988,939 | 11/1976 | Stoner | 74/29 |

*Primary Examiner*—Samuel Scott
*Assistant Examiner*—Wesley S. Ratliff, Jr.
*Attorney, Agent, or Firm*—Bruce G. Klaas

[57] ABSTRACT

It is a purpose of this invention to provide for highly efficient transmission of power delivered either manually or thru any other means from the source to the output point, whether either is rotary or reciprocating, thru an infinitely variable range beginning with zero.

34 Claims, 30 Drawing Figures

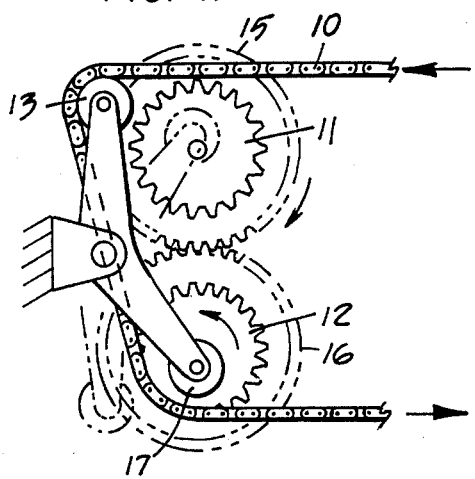
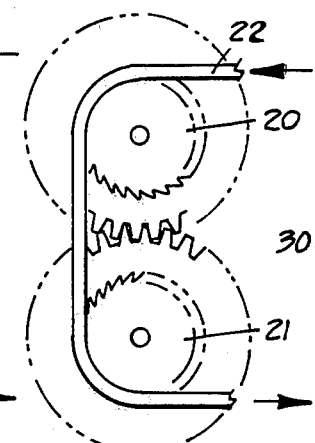
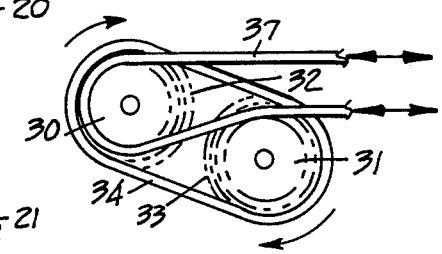
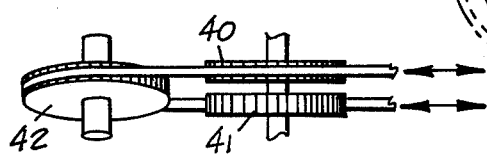
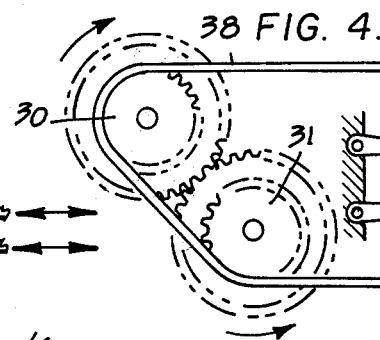
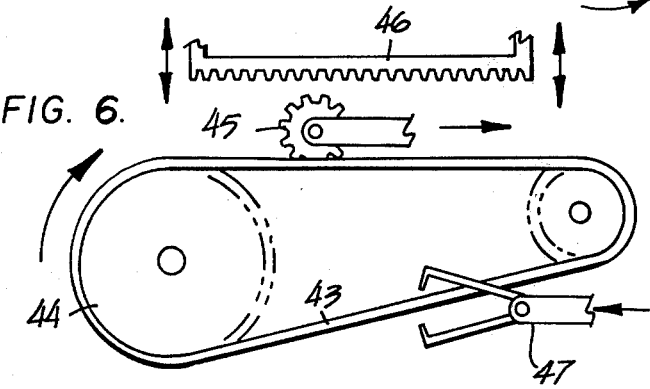
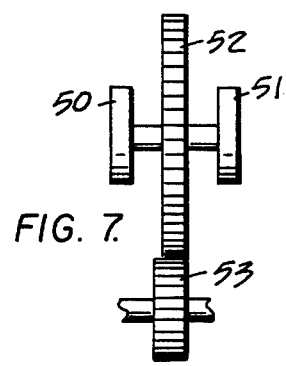
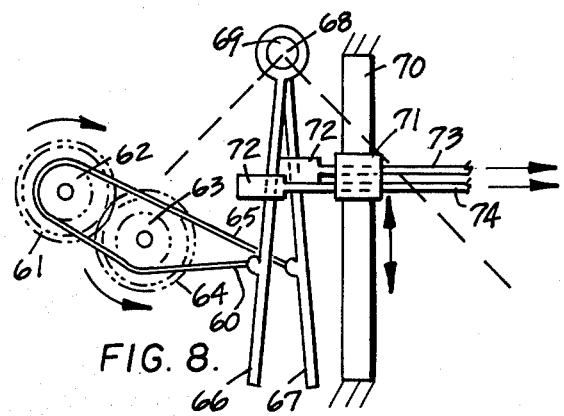
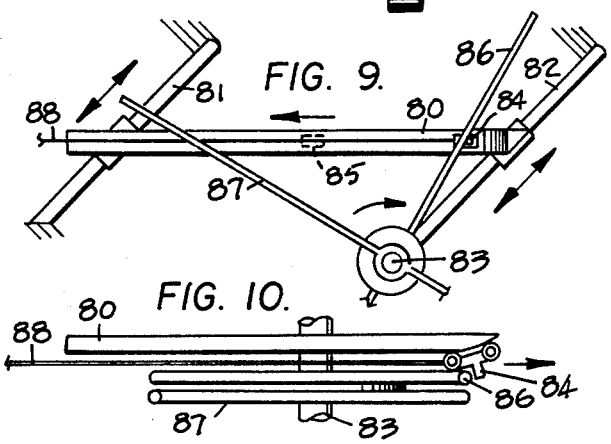

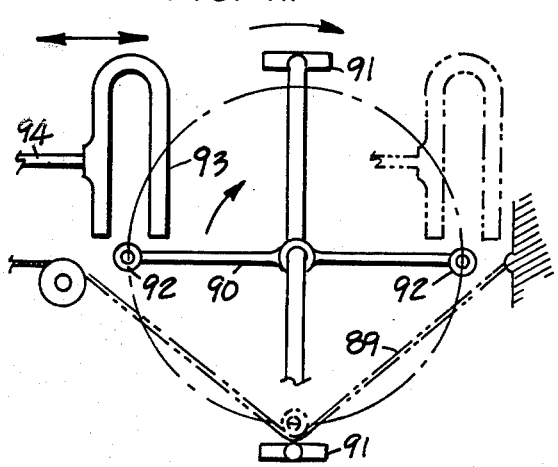
FIG. 11.
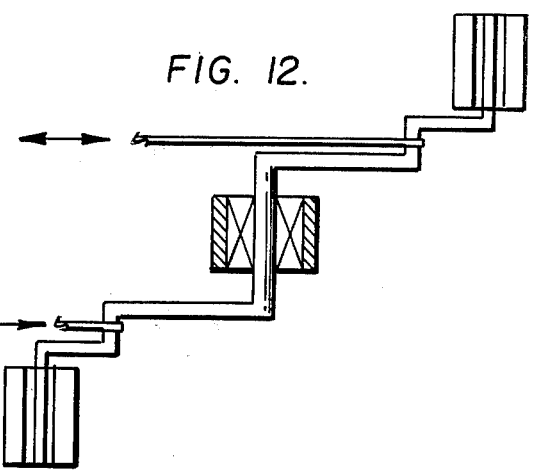
FIG. 12.
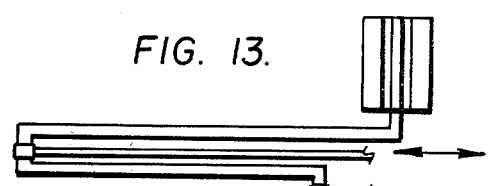
FIG. 13.
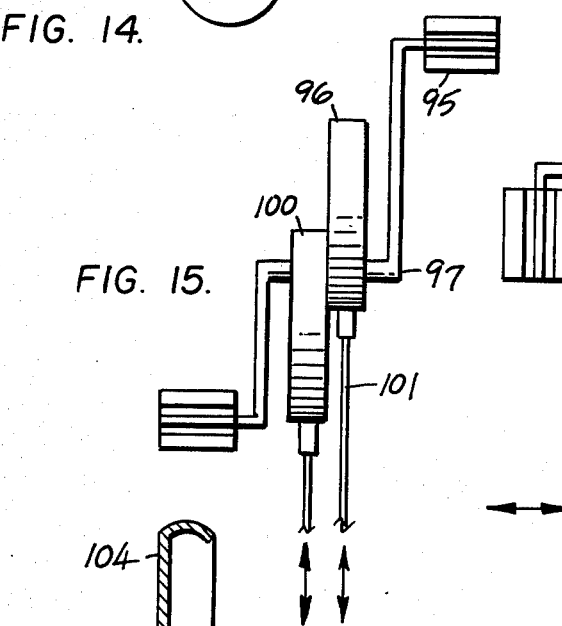
FIG. 14.
FIG. 15.
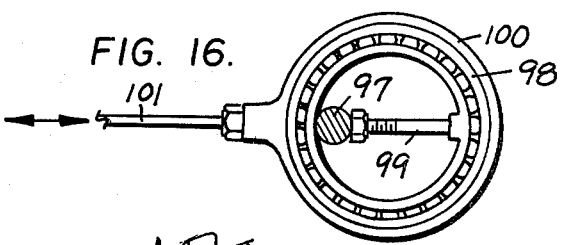
FIG. 16.
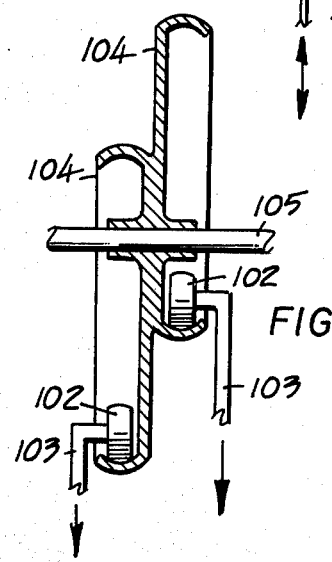
FIG. 17.
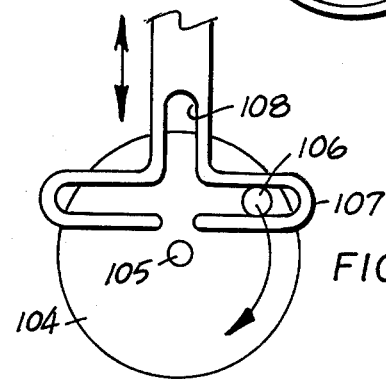
FIG. 18.

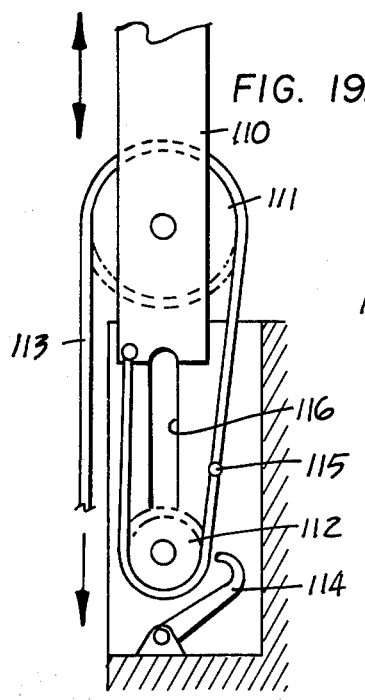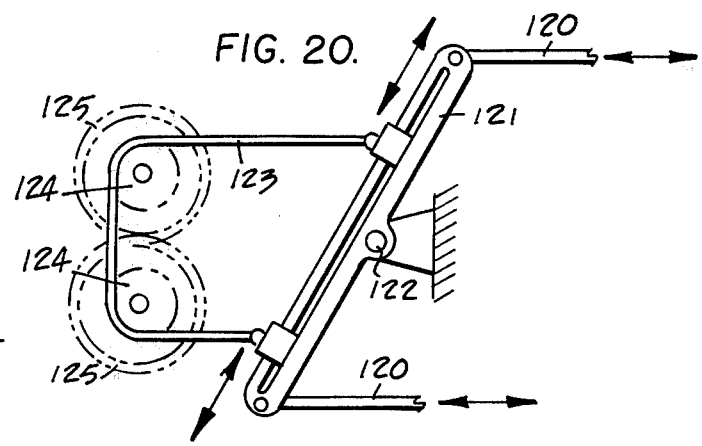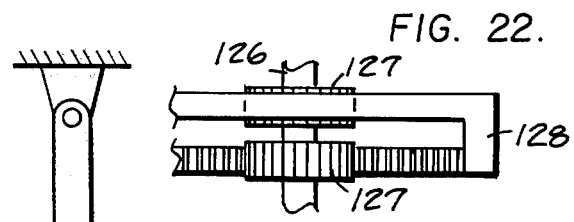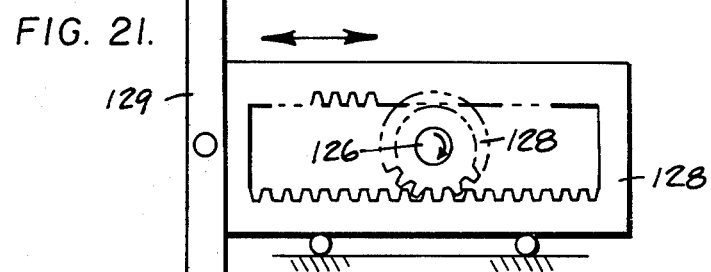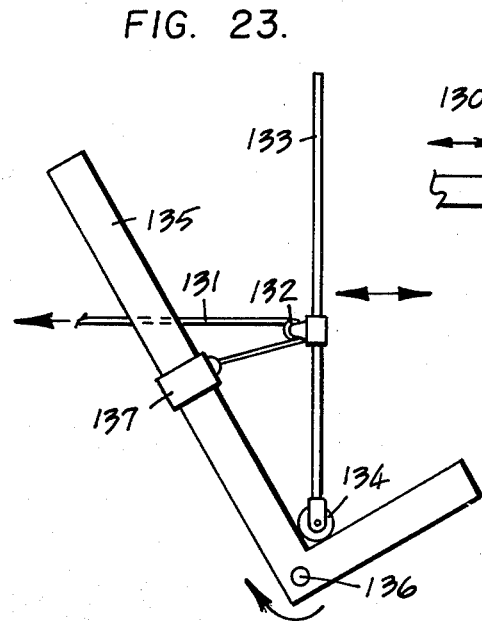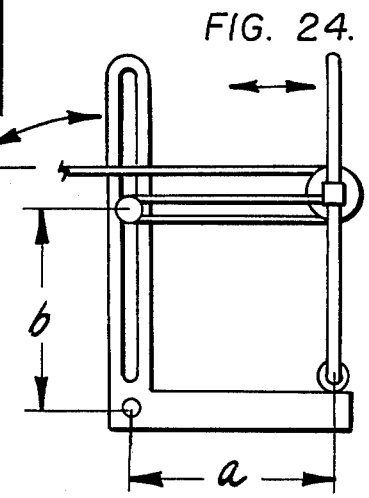

ured with the bike driver's peak of demand, and the demand is zero when the availability of crack pin force is also zero.

INFINITELY VARIABLE (FROM ZERO UP) TRANSMISSIONS, WITH CONSTANT OR HARMONIC POWER INPUT AND A CHAIN GEAR MULTIACTION CAM

This is a continuation of application Ser. No. 438,728, filed Feb. 1, 1974, now abandoned.

It is also an object of this invention to provide a variety of methods for conversion of rotary motion into reciprocating and vice versa.

An additional object of the present invention is to make it possible to choose between a constant torque demand at the input end, and a harmonic (sinusodial) input demand, so that the peak torque available from a bicycle driver or a reciprocating piston is matched with the peak of demand, and the demand is zero when the availability of crack pin force is also zero.

It is a further object of this invention to provide for increasing speed range levels within which the infinite changeability exists, so that once the maximum speed at the first level is attained, the minimum speed of the second level takes over, than the third etc.

It is yet another object of the invention to provide for either rigid or flexible power transfer from input to the ultimate output point.

It is yet another object of this invention to provide a chain gear for mating with the conventional sprocket, which can be made in a variety of shapes, thus providing a driving or driven multiplane acting cam as well.

These and other objects will become apparent as the functioning of the mechanisms pictured in FIGS. 1 thru 30 is described below.

In general, the present invention comprises:

(1) An infinitely variable, from zero up, power transmission system, as shown in the drawing, with either reciprocating or rotary power input, in which the rotary input is first translated into a reciprocating force, and said reciprocating action then altered in magnitude, prior to being retranslated into unidirectional rotary motion, by one or more of the means of FIGS. 4, 6, 8-10, 19-24.

(2) Means for translating reciprocating force into unidirectional rotary action, in which two sprockets/gears are mated, one fixed to the output shaft, and in which the chain, rack, cable, or any other force transmitting means is alternately engaged and disengaged with each sprocket/gear, either through tension activated lifting mechanism or through the one direction acting only geometry of the teeth on either the gear or force delivery means as shown in FIGS. 1-5 & 7.

(3) Means for translating reciprocating force into unidirectional rotary action in which a single short segment of chain is looped around two oppositely facing freewheel ratchets or override clutches, each mounted on a gear/sprocket which is mated with the other, one of the gears driving the output shaft either directly or through an intermediate of any kind as shown in FIGS. 1-4, 8 & 20.

(4) Means for translating reciprocating force into unidirectional rotary action in which a pair of override ratchets, mounted on the same axis or adjacent, and facing in the same rotation direction, are both driven by a single short segment of chain, dual rack, cable, or any other readily apparent means, with the driving means either remaining on the same plane, or being deflected from the plane of the first ratchet into the next, and producing unidirectional rotary motion by acting upon opposite sides of each ratchet as shown in FIGS. 1-5.

(5) Means for increasing the speed range through a single or multiple block and tackle arrangement, where the arresting of one or more of the components is utilized to multiply—or reduce—the speed range by a factor of one or more as shown in FIGS. 4, 6 & 19.

(6) Means for increasing the speed range in which an one way gear, wheel, or sprocket is used to propell a mating chain, rack, etc., and which is at will mated with a stationary chain segment, rack, or surface, thus adding rotary motion to its previous translation as shown in FIG. 6.

(7) Means for producing a reciprocating stroke from rotary crank, as shown in FIGS. 9-18, in which a double crank is provided on one side of the input shaft, or a single crank on each side, to which push/pull means, such as shown in FIGS. 4, 6, 8-13 & 15-24, are suitably attached.

(8) Means for producing reciprocating motion in which rollers attached to a bar fixed a ninety degrees to the crank enter slots to which pull means are affixed as the crank is at minimum force (dead point) position, and exit the slots at a point 180 degrees away, thus producing harmonic reciprocating motion in which the availability of input force at crank pin is matched with demand from the pull means as shown in FIG. 11.

(9) Means for producing harmonic reciprocating motion of crank frequency or larger, in which a flexible pull means or linkage are fixed at one end and supported just beyond the crank diameter on a pulley, with the crank placed between the fixed end and support point, and in which rollers placed on the crank deflect said pull means as the crank moves through 90 degrees from contact, and release the deflection in the next 90 degrees, though it is obvious that any other angle relationship can be chosen, as shown in FIG. 11.

(10) Means for producing reciprocating motion in which discs are eccentrically mounted on a straight shaft, and either held rotatably by a clamp or ring to which the pull/push means are attached, or in which rollers affixed to the push/pull means are perimetrically guided as shown in FIGS. 14-18.

(11) Means for converting rotary power input into reciprocating motion at constant demand force which also serve as an infinitely variable speed changer; in which the ends of the reciprocating drive segment are guided in a locator bar placed next to the crank, where they are gripped by the protrusions from the rotating disc, radial ridges, or bars perpendicular to the input shaft, and forced forward along the locator bar until retracted or recessed out of the way of said rotating protrusions; where the radial protrusions can be 180 degrees from each other on each side but 90 degrees out of phase side to side, or any other desired frequency; and where the locator bar carrying the ends of the reciprocating drive segment is adjustable up and down at an angle maintaining its retraction or recession point in proper relationship with the driving protrusion frequency as shown in FIGS. 9 & 10.

(12) Means for infinitely varying the motion of the reciprocating drive segment through slidably attaching each end of it to a pull rod,, pivoted on one end, and oscillated by a fixed or variable reciprocating input force, the point of application of which is adjustable along the rod, producing larger swing and therefore drive motion the nearer the oscillating force is placed to the pull rod pivot point, and where additional variants can be had by also sliding the points of attachment of the drive segments along the rod as shown in FIGS. 8–10 & 20–24.

(13) Means for producing reciprocating motion from rotary with the use of a straight shaft, upon which a disc or a single arm, carrying a roller on its extremity, is mounted; the roller to be engaged in a yoke at the lower end of the connecting rod, which is restrained to move in a straight line only, and which has a slot cut through the yoke into the connecting rod lower portion, deep enough to match at least the length of the crank, so that in motion the rod straddles the shaft, with the slot being wider than the shaft diameter for clearance, and the roller larger than the slot as shown in FIG. 18. The shape of the yoke will produce departures from pure harmonic motion, and the rod can be stopped, slowed, or speeded up in relation to crank during any part of the cycle.

(14) An infinitely variable transmission in which a bar, pivoted about its center, is oscillated by one push-/pull force or two alternating pull forces, with the point of application of the oscillating force being either fixed or slidably adjustable along the bar, and to which both ends of the driving force transmitting means, whether flexible (chain, cable) or rigid, (linkage, rack, etc.), are also slidably attached; either or both the applied force and the transmitted force can be relocated along the bar through any conventional control means as shown in FIG. 20.

(15) An infinitely variable transmission in which one push/pull rod is pivoted at one end and is connected to a dual rack mated respectively on top and bottom of two oppositely facing override gears, mounted on the output shaft; the oscillating input force applicator is wedge shaped, the opening in the top of the wedge being slightly wider than the amplitude of oscillation, permitting when the oscillating force applicator is at the end of the push/pull rod, full oscillation yet zero power transmission as shown in FIG. 21.

(16) An infinitely variable power transmission in which the oscillating input force is constant in amplitude, consisting of the input rod, cradled in the "L" shaped output arm, which is pivoted at the corner of the "L", and block and tackle flexible power output means (chain, cable, etc.), in which the location of the power output means both on the input rod and on the output arm is selectable through a variety of conventional means, and in which the ratio of the height above the pivot of the output block and tackle system to the amplitude of the oscillating force determines for each type of block and tackle arrangement used the input/output relationship, with ranges from and including zero to as high as desired as shown in FIGS. 23 & 24.

(17) A chain gear in which a standard chain is mounted on any circular support and fixed to it in at least one point, or in which only the chain rollers are placed on pins the proper pitch distance apart in any form of support, providing a mating gear for chain sprockets as shown in FIGS. 25–28.

(18) A multiaction chain/gear/cam, in which either a standard chain or a series of chain rollers are mounted along any desired shape between supports, and mated with a sprocket the curvature of which is not larger than the smallest present in the cam; either the cam or the sprocket can be the driver, and either shaft can be floating as shown in FIG. 27.

(19) A variable diameter chain gear, (or gear chain mate for the conventional chain) in which a cone is slotted to permit axial movement of a chain retainer. The chain is slidably attached to one edge of the slot, and reserve length is wound, under spring bias, inside the cone, entering through the same slot after circling the cone. Retainer positioning is accomplished through conventional means, so calibrated that each position produces an integral number of chain links on the cone surface as shown in FIGS. 29 & 30.

FIGS. 1 thru 5 show conversions of reciprocating into unidirectional rotary motion.

FIG. 6 shows in addition one way to add higher speed ranges.

FIG. 7 depicts one way to convert reciprocating into rotary at a constant ratio.

Figure 25:
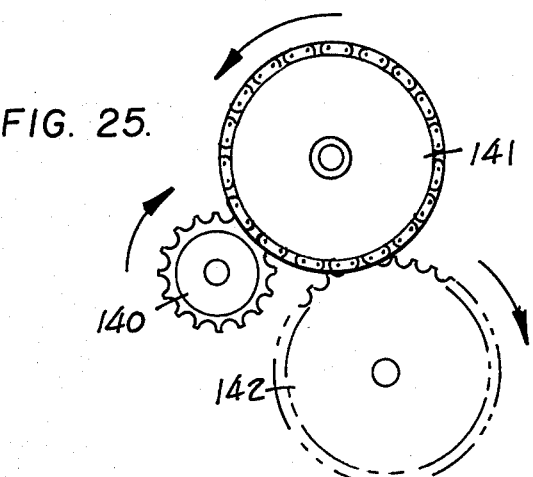

FIG. 8 pictures conversion of fixed reciprocating stroke into infinitely variable rotary motion.

FIGS. 9 and 10 show conversion of rotary crank motion to four reciprocating strokes per revolution, as well as a method for infinitely varying the length of these strokes.

FIGS. 11 thru 18 picture conversions of rotary into reciprocating motion.

FIG. 19 shows another way to double and triple the range.

FIGS. 20 thru 24 depict three versions of infinitely variable speed changers.

FIGS. 25 thru 30 deal with the chain gear/multication cam.

In FIG. 1 chain 10 is engaged with sprocket 12 and is held free of sprocket 11 by roller 13. 12 is a freewheeling sprocket, working only counterclockwise. As the chain moves in direction shown, 12 drives 16, which turns 15 clockwise. 15 is mounted on the output shaft. As direction of chain 10 reverses, rollers 13 and 17 move to positions shown by dashed lines; chain 10 is lifted from sprocket 12 and engages 11. Smooth mating is assured since gears are locked together. Chain now drives 11 directly, clockwise, driving the shaft. Thus reciprocating chain action results in unidirectional rotary motion of the shaft.

In FIG. 2 ratchet type teeth are provided, and both 20 and 21 are not free wheeling. When chain is pulled as shown, it slides free off 20, and engages 21. Reverse is true in the other direction. 20 is mounted on the wheel shaft, and is driven by 21 when itself not driven by chain (connection 20 to 21 not shown).

FIG. 3 depicts use of free wheel ratchets, both working only clockwise: Ratchet 30 is rotated by chain 37, driving wheel shaft. When chain reverses, ratchet 31 drives sprocket 33, which is connected by chain 34 to sprocket 32 and the shaft.

In FIG. 4 ratchets are mounted on sprockets engaged directly (as in FIG. 1), eliminating chain 34. Chain 38 is moved by pulling alternately on rollers 35. When the end of the chain 39 is arrested by hook 36, every inch of motion at 35 produces two inches at the sprocket (2:1 ratio). Thus "low" and "high" ranges can be used for any speed changer coupled to this system. When hooks 36 are not engaged, drive is direct as in FIG. 1.

FIG. 5 shows ratchets 40 and 41, with chain directed from 40 to 41 by inclined pulley or ratchet 42.

In FIG. 6 sprocket 44 is on the wheel shaft, and is driven by chain 43; 43 is moved by ratchet 45, which rotates only counter-clockwise. A rigidly mounted chain segment 46 can be lowered to engage 45 as it moves forward, thus doubling the speed. A chain gripping means 47 may be used in lieu of the means 45 for alternately gripping and releasing the chain 43.

FIG. 7 shows ratchets 50 & 51 on either side of 52, and any permanent ratio of 52 to 53 can be chosen.

FIG. 8 has ratchet 62 and sprocket/gear 61 mounted on the wheel shaft; 64 engages 61, and is driven by counterclockwise working ratchet 63. Each end of the chain 60 & 65 are connected respectively to rods 66 and 67, which are pivoted at 68 and 69. Forward motion on rod, 66 or 67, moves the other rearward. Slender rods 74 and 73 are connected to driving pedals or the like, and hold rods 66 and 67 in the slides 72. Pedals produce a fixed length "pull" stroke. The vertical location of guide 71 on locator bar 70 determines the movement of the chain on each pull stroke. (Example: using a permanent 2:1 ratio, rod 66 needs to be only 4 inches long and the stroke at pedal approximatey 1 inch to 1¼ inches—to produce a speed range from 5:1 to approximately 0.5 in a normal bicycle.)

FIGS. 9 & 10: 83 is the pivot for the pedal crank. To the crank 83 a disc with wo perpendicular ridges, 86 and 87, (or perpendicular rods), are attached, each acting every half revolution; therefore side 1 acts at zero degrees, side 2 at 90 degrees, side 1 at 180 degrees, and side 2 at 270 degrees, etc. Pull rod 88 is attached to grip 84. Bar 86 is shown pulling 84 along guide bar 80. As end of 80 is reached, 84 swings free of 86, and simultaneously 87 engages the other grip, 85. Dashed lines in FIG. 9 show 84 approaching end of stroke, while 85 is returning to the start position. The position of 80 on slides 81 & 82 is controlled by the driver through any conventional means: up is faster, down is slower; again, 4 or so inches give the same 5/1 to a fraction ratios.

FIG. 11 shows a bar 90 with rollers 92 at its ends mounted on pedals 91. As rotation takes place, roller 92 enters yoke 93, which is attached to the push/pull rod 94. Harmonic force match exists; at veritcal pedal position, (as shown), at zero force availability, force demand on leg is zero; at 90 degrees, the maximum capability position, the force demand is maximum, and goes down to zero again at 180 degrees. Thus crank pin force demand and capability are evenly matched, and less fatigue and higher power, (more work per unit time) result. Also in FIG. 11 cable 89 is fixed at one end, and its other end moves in reciprocating motion when deflected by roller 92, providing an alternate harmonic force generation.

FIGS. 12 & 13 show still other ways of producing sinusoidal motion, as does FIG. 14. In this case two discs, bearings, etc. are mounted excentrically on the pedal crank, and produce harmonic displacement. FIGS. 15 16, and 17 help to visualize the motion: a round disc 96 is mounted excentrically on crank 97. In FIG. 16 a bearing is used, mounted excentrically with the aid of bolt 99; a clamp 100 is placed about the exterior race of bearing 98, and the pull/push means (a rod, or merely a chain or cable for pull function only) 101 is affixed to the clamp 100. If the pedal—or piston—relationship to the position of the excentric disc is as shown, (at ninety degrees), then force availability and force demand are matched harmonically. FIG. 17 achieves the same effect by utilizing dished discs 104, with pull means 103 attached to rollers 102.

In FIG. 18 disc 104 is mounted on shaft 105, and roller 106 is held in the disc. The roller 106 rides inside yoke 107, which is at the extremity of a connecting rod. Slot 108 is cut in the rod, so that as the shaft rotates and the connecting rod is pulled down, slot 108 clears shaft 105. Motion of the connecting rod is vertical only. There are two advantages to this design: (a) a straight shaft with a crank or disc is lighter and less expensive to manufacture, and (b) yoke 107 can be made in any desirable shape; its straight horizontal shape shown produces pure harmonic motion, but curved shapes for yoke 107 would stop, slow, or speed the motion of the connecting rod for any part of the revolution. In this figure roller 106 is larger than the diameter of shaft 105, so that it can not leave the yoke thru the slot provided for the shaft.

FIG. 19 depicts one version of—in this case—three level speed variant. Chain 113 (or cable) goes over pulley 111, which is mounted in pull arm 110, then continues around pulley 112, which is free to slide in slot 116; the end of the chain is then fixed to pull arm 110. Pin 115 is fixed to one of the chain links. When arm 110 is pulled, (upward in this figure) roller 112 would normally be resting against arm 110 and chain 113 would move on a 1:1 basis with arm 110. When arm 114, however, grips the shaft of pulley 112 and holds it stationary as arm 110 is pulled, the ratio is 1:3. Similarly, if pin 115 is gripped, and pulley 112 freed to move with arm 110, the arm to chain ratio becomes 2:1. Clearly, many other combinations are achievable.

FIG. 20 depicts another version of converting reciprocating motion, whether variable or fixed, into infinitely variable rotary motion. Push/pull rod 120—or two pull only means 120—are fixed to bar 121, which is pivoted on a fixed point 122. Chain or cable 123 is captive in slides on bar 121, and can be moved up and down the bar 122 thru any conventional means. Chain 123 is looped around oppositely facing freewheel ratchets 124, and as bar 122 is moved by means 120, chain 123 alternately drives thru ratchets 124 gears 125, one of which is attached to the output shaft. Obviously, the point of application of means 120 can also be made slidable to increase the versatility of the transmission, and the system pictured in FIG. 19 can be interposed between either the chain 123 and bar 122, or the bar and the pull means 120, to still increase the range.

In FIG. 21 bar 129 is pivoted on its upper end to swing free, and is guided in that swing by slider 130, which is attached to push/pull means not shown here. In the position indicated, the slider 130 oscillates without moving rod 129; as slider 130 is moved upward, its narrower portion comes in contact with bar 129, and motion begins; the higher the slider 130, which oscillates in this example at a constant amplitude, moves the greater the movement of bar 129. Dual rack 129 is mated with oppositely facing freewheel (override clutch) mounted ratchets 127, which alternately turn output shaft 126.

FIGS. 23 and 24 display still another version of infinitely variable transmissions. The one shown in FIG. 23 has a range from zero to 2:1, and FIG. 24 moves from zero to 3:1. Obviously, many other ranges are possible. Rod 133 is moved by an oscillating push/pull or two pull means (not shown) in either constant or independently variable horizontal motion. The vertical position of rod 133 is maintained by restraints not shown here. As rod 133 is pulled right from the position shown, roller 134 which is mounted on its lower end tips arm 135 about pivot 136 to vertical position. The beginning of work stroke is pictured in FIG. 23, the end in FIG. 24. Chain or cable guide roller 132 moves thru the same distance as rod 133, no matter where on rod 133 it is positioned. Slider 137, however, has a displacement directly proportional to its elevation on arm 135: the higher, the greater its movement. At the bottom of arm 135, slider 137 has virtually no movement, and every inch of motion by rod 133 results in two inches of movement by the chain 131. When the vertical position of slider 137 is above the pivot point by a distance (b) equal to the movement of rod 133 (a), the ratio of the input (rod movement) to the output, (chain movement), is 1:1; and when (b) is twice (a) in FIG. 23, the input/output ratio is zero: even though rod 133 is still oscillating thru the distance (a), slider 137 moves thru two (a), producing enough slack to take up the entire motion, and the output end of chain 131 remains stationary. Obviously, distance (b) must be in relation to the mechanical advantage: in FIG. 24 output is zero when (b) is 1.5 times (a).

In FIG. 25 sprocket 140 is mounted on the output shaft, and is mated with a "chain gear" 141, which in turn is engaged with sprocket 142. The chain gear is further defined in FIG. 26, where a standard chain segment 146 is closed around a disc 145 and retained by clips 147. Another form of retaining a standard chain can be also seen from FIG. 28, where the chain could simply be laid on the shoulders of discs 148, and anchored in one or more places by placing longer pins thru holes 150.

Figure 26:
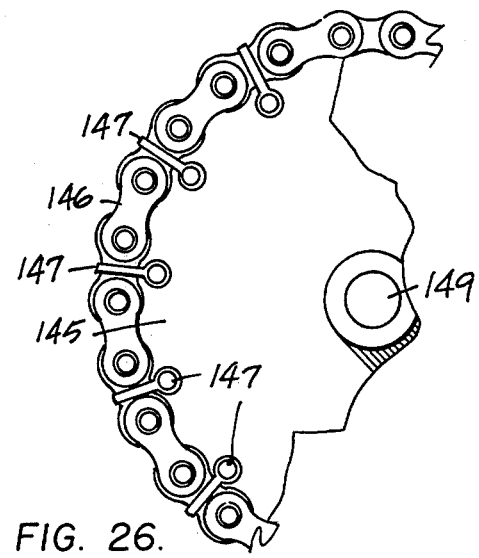
Figure 27:
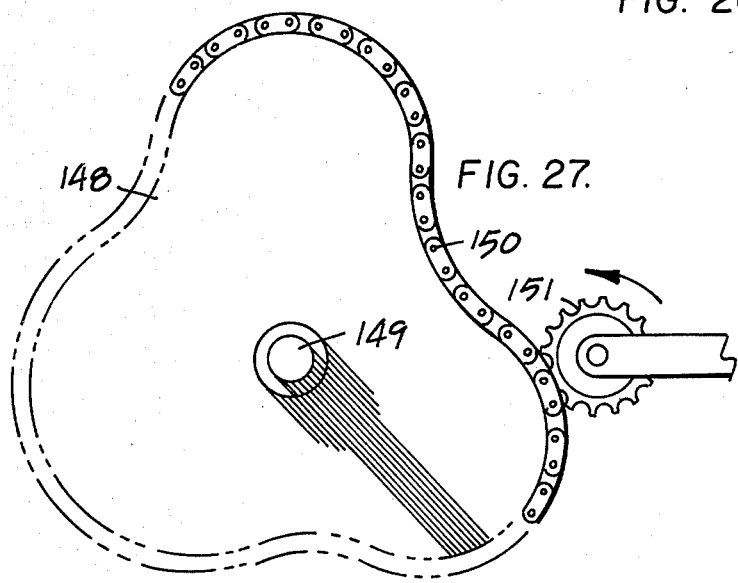
Figure 28:
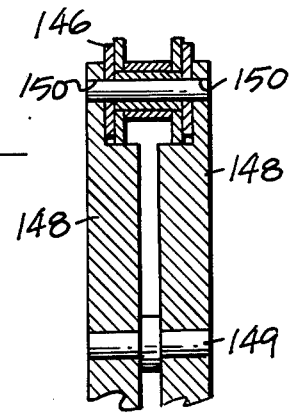

FIG. 27 pictures the multiaction/cam/gear: although chain can be laid around the perimeter with retainers somewhat in the fashion of FIG. 26, we chose here to display individually held rollers; two plates of any desired shape (or one plate with a groove machined in it) 148, are mounted on shaft 149, and chain rollers are mounted on pins thru holes 150. Thus the sprocket 151 is engaged with what for all practical purposes functions like a chain, with the chain-sprocket high efficiency. As long as the curvature of 148 is at no point smaller than the radius of sprocket 151, the shape of 148 determines the velocity of rotation and position of either; (148, or 151 can be fixed).

Figure 29:
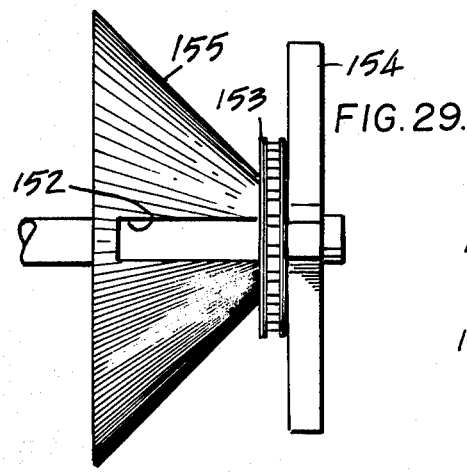
Figure 30:
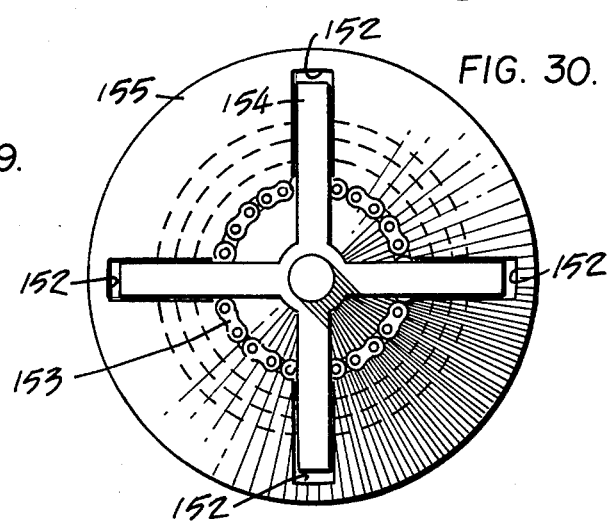

FIG. 29 and 30 depict a variable pitch chain gear. Cone 155 has slots 152 cut in it and an axially slidable star shaped retainer is placed in the slots. Either a gear chain (designed to mate with and drive a conventional chain), or a normal chain is wound inside the cone, emerging from one side of the slot 152 wrapped once around the surface of the cone and attached to the other side of the slot from which it emerged so that it is free to slide axially. When retainer 154 is moved, the chain slides up or down the cone, either drawing additional length needed from inside the cone, or storing it back inside. Obviously, only one directional drive is possible, against the attached side of the chain, but many gripping arrangements will be obvious to those skilled in the art, and two directional action can be so easily provided as well.

In general, the aforedescribed apparatus may be used in various combinations to provide a variable power transmission system comprising means for translating input motion into variable rate reciprocating motion, such as depicted in and described by reference to FIGS. 9 & 10, 11–18 and 27 & 28; means for translating the variable rate reciprocating motion into uni-directional rotary motion of an output shaft, such as depicted in and described by reference to FIGS. 1–5, 7, 8, 20, 25–26, 29 & 30; reciprocating motion transfer means for translating the reciprocating motion into rotary motion, such as depicted in and described by reference to FIGS. 1–6, 8–24 & 27; the velocity and or speed changing means for changing the velocity of the variable rate reciprocating motion to provide for varying rotational speeds of the output shaft, such as depicted in and described by reference to FIGS. 4, 6, 8–10, 19–24 & 27–30. The rotational speed of the output shaft may be substantially infinitely varied within a given speed range by the apparatus of FIGS. 8–10 & 20–24, for example, and the speed range may be changed, e.g. from 1:1 to 2:1 or 3:1 etc., by the speed multiplication means of FIGS. 4, 6 or 19, for example. As is apparent from the drawing and the description, the various types of apparatus may be used by themselves or in various combinations. For example, the apparatus of FIGS. 4, 8 & 14 & 15 may be combined so that the pedals 95 and cranks 97 of a bicycle or the like drive the discs 96, 100 which drive the pull/push means 101 and provide means for translating input motion into variable rate reciprocating motion. The pull-/push means 101 may be connected to the rollers 35 of FIG. 4 or the rods 73, 74 of FIG. 8. In addition, the rollers 35 may be connected to the oscillator rods 66, 67 of FIG. 8 in place of the chain 60 of FIG. 8 so that both the speed range multiplication means of FIG. 4 and the infinitely variable speed change means of FIG. 8 are employed in the transmission system. Various other combinations of the apparatus of the present invention will be readily apparent to those skilled in the art based upon the foregoing description.

The particular embodiments of the inventions are to be considered illustrative only. The present invention includes such modifications and equivalents as may occur to those skilled in the art, within the scope of the appended claims.

What I claim is:

1. An infinitely variable transmission in which one push/pull rod is pivoted at one end and is connected to a dual rack mated respectively on top and bottom of two oppositely facing override gears, mounted on an output shaft; an oscillating input force applicator which is wedge shaped and has an opening in the top of the wedge being slightly wider than the amplitude of oscillation, permitting when the oscillating force applicator is at the end of the push/pull rod, full oscillation yet zero power transmission.

2. An infinitely variable power transmission in which an oscillating input force is constant in amplitude, consisting of an input rod, cradled in an "L" shaped output arm, which is pivoted at the corner of the "L", and block and tackle flexible power output means, in which the location of the power output means both on the input rod and on the output arm is selectable and in which the ratio of the height above the pivot of the power output means to the amplitude of the oscillating force determines the input/output relationship, with ranges from and including zero to as high as desired.

3. A variable power transmission system comprising: means for translating input motion into variable rate reciprocating motion, means for translating said variable rate reciprocating motion into unidirectional rotary motion of an output shaft, and speed change means for acting upon said means for translating said reciprocating motion into said rotary motion for selectively multiplying or reducing the amount of rotary motion of said output shaft for any given amount of reciprocating motion transmitted thereto; and further comprising means for substantially infinitely varying the velocity of the variable rate reciprocating motion within a predetermined variable velocity range; and wherein said means for substantially infinitely varying the velocity of the variable rate reciprocating motion comprising oscillator means having a pivotal axis and extending radially therefrom for oscillating movement between opposite extreme positions along an arc, and said selectively adjustable means comprising connecting means for variably selectably connecting said second means for translating said variable rate reciprocating motion into unidirectional rotary motion of an output shaft to said oscillator means at various radially displaced positions therealong.

4. The invention of claim 3 wherein said input motion is reciprocating.

5. The invention of claim 3 wherein said input motion is rotary.

6. The invention as defined in claim 5 and wherein said means for translating input motion into variable rate reciprocating motion being further adapted for matching peak torque available thereto with the peak torque demand applied thereto.

7. The invention as defined in claim 6 and wherein said means for translating input motion into variable rate reciprocating motion being further adapted for matching minimum torque available thereto with apparent minimum torque demand applied thereto.

8. The invention as defined in claim 5 and wherein said means for translating input motion into variable rate reciprocating motion being further adapted to harmonically match torque available thereto with torque demand applied thereto.

9. The invention as defined in claim 5 and wherein said means for translating input motion into variable rate reciprocating motion being further adapted to match torque available thereto with torque demand applied thereto in accordance with desired preselected torque characteristics of said transmission.

10. The invention as defined in claim 3 and wherein said speed change means being further adapted for multiplying or reducing by a factor of one or more the velocity of the unidirectional rotary motion of the output shaft within the predetermined variable velocity range of said means for substantially infinitely varying the velocity of the variable rate reciprocating motion.

11. The invention as defined in claim 5 and wherein said power transmission means being mounted on a bicycle, said bicycle comprising pedal operated power input means for applying input power to the transmission, said means for translating input motion into variable rate reciprocating motion being operatively connected to said pedal operated power input means, said bicycle further comprising a rear wheel having a rear axle and a drive sprocket wheel means operatively connected to said rear axle for causing unidirectional rotation thereof, said output shaft comprising said rear axle, and said means for translating said variable rate reciprocating motion into unidirectional rotary motion of an output shaft comprising said drive sprocket wheel means.

12. The invention as defined in claim 11 and wherein said means for translating input motion into variable rate reciprocating motion being further adapted for matching peak torque available thereto with the peak torque demand applied thereto.

13. The invention as defined in claim 12 and wherein said means for translating input motion into variable rate reciprocating motion being further adapted for matching minimum torque available thereto with apparent minimum torque demand applied thereto.

14. The invention as defined in claim 11 and wherein said means for translating input motion into variable rate reciprocating motion being further adapted to harmonically match torque available thereto with torque demand applied thereto.

15. The invention as defined in claim 11 and wherein said means for translating input motion into vairable rate reciprocating motion being further adapted to match torque available thereto with torque demand applied thereto in accordance with desired preselected torque characteristics of said transmission.

16. The invention as defined in claim 11 and wherein said speed change means being further adapted for multiplying or reducing by a factor of one or more the velocity of the unidirectional rotary motion of the output shaft within the predetermined variable velocity range of said means for substantially infinitely varying the velocity of the variable rate reciprocating motion.

17. A variable power transmission system comprising means for translating input motion into variable rate reciprocating motion, means for translating said variable rate reciprocating motion into unidirectional rotary motion of an output shaft, reciprocating motion transfer means for translating said reciporcating motion into said rotary motion, and velocity changing means for changing the velocity of said variable rate reciprocating motion to provide for varying rotational speeds of said output shaft; said velocity changing means comprising oscillator means having a pivotal axis and extending radially therefrom for oscillating movement between opposite extreme positions along an arc, and connecting means for variably selectably connecting said means for translating said variable rate reciporcating motion into unidirectional rotary motion of an output shaft to said oscillator means at various radially displaced positions therealong.

18. The invention as defined in claim 17 and further comprising speed change means for acting upon said reciprocating motion transfer means for translating said reciprocating motion into said rotary motion for selectively multiplying or reducing the rotational speeds of said output shaft for any given velocity of variable rate reciprocating motion available for transmittal thereto.

19. The invention as defined in claim 17 and wherein said input motion is rotary motion.

20. The invention as defined in claim 17 and wherein said means for translating input motion into variable rate reciprocating motion being further adapted for matching peak torque available thereto with the peak torque demand applied thereto.

21. The invention as defined in claim 20 and wherein said means for translatig input motion into variable rate reciprocating motion being further adapted for matching minimum torque available thereto with apparent minimum torque demand applied thereto.

22. The invention as defined in claim 17 and wherein said means for translating input motion into variable rate reciprocating motion being further adapted to harmonically match torque available thereto with torque demand applied thereto.

23. The invention as defined in claim 17 and wherein said means for translating input motion into variable rate reciprocating motion being further adapted to match torque available thereto with torque demand applied thereto in accordance with desired preselected torque characteristics of said transmission.

24. The invention as defined in claim 17 and wherein said velocity changing means comprises means for substantially infinitely varying the velocity of the variable rate reciprocating motion within a predetermined variable velocity range.

25. The invention as defined in claim 28 and further comprising speed change means for acting upon said means for translating said reciprocating motion into said rotary motion for selectively multiplying or reducing the rotational speeds of said output shaft for any given velocity of variable rate reciprocating motion available for transmittal thereto.

26. The invention as defined in claim 25 and wherein said speed change means being further adapted for multiplying or reducing by a factor of one or more the velocity of the unidirectional rotary motion of the output shaft within the predetermined variable velocity range of said means for substantially infinitely varying the velocity of the variable rate reciprocating motion.

27. The invention as defined in claim 17 and wherein said power transmission system being mounted on a bicycle; said means for translating input motion into variable rate reciprocating motion being operatively connected to pedal operated power input means on the bicycle for applying input power to the transmission; and said means for translating said variable rate reciprocating motion into unidirectional rotary motion of an output shaft comprising sprocket wheel means operatively connected to a rear wheel of the bicycle having a rear axle constituting the output shaft.

28. The invention as defined in claim 17 and wherein said power transmission means being mounted on a bicycle, said bicycle comprising pedal operated power input means for applying input power to the transmission, said means for translating input motion into variable rate reciprocating motion being operatively connected to said pedal operated power input means, said bicycle further comprising rear wheel having a rear axle and a drive sprocket wheel means operatively connected to said rear axle for causing unidirectional rotation thereof, said output shaft comprising said rear axle, and said means for translating said variable rate reciprocating motion into unidirectional rotary motion of an output shaft comprising said drive sprocket wheel means.

29. The invention as defined in claim 28 and wherein said means for translating input motion into variable rate reciprocating motion being further adapted for matching peak torque available thereto with the peak torque demand applied thereto.

30. The invention as defined in claim 29 and wherein said means for translating input motion into variable rate reciprocating motion being further adapted for matching minimum torque available thereto with apparent minimum torque demand applied thereto.

31. The invention as defined in claim 28 and wherein said means for translating input motion into variable rate reciprocating motion being further adapted to harmonically match torque available thereto with torque demand applied thereto.

32. The invention as defined in claim 28 and wherein said means for translating input motion into variable rate reciprocating motion being further adapted to match torque available thereto with torque demand applied thereto in accordance with desired preselected torque characteristics of said transmission.

33. An infinitely variable transmission including bar means pivoted for oscillation about a fixed pivot means, reciprocating means being attached to said bar means for drivingly oscillating said bar means, motion transmitting means being attached to said bar means for transmitting motion from said bar means to a point of output use, the points of attachment of said reciprocating means to said bar means and of said transmitting means to said bar means being selectively variable, control means for varying said points of attachment.

34. A variable power transmission system comprising:
    means for translating input motion into variable rate reciprocating motion, means for translating said variable rate reciprocating motion into undirectional rotary motion of an output shaft, and speed change means for acting upon said means for translating said reciprocating motion into said rotary motion for selectively multiplying or reducing the amount of rotary motion of said output shaft for any given amount of reciprocating motion transmitted thereto and wherein said input motion is reciprocating.

* * * * *